Patented Nov. 29, 1949

2,489,777

UNITED STATES PATENT OFFICE 2,489,777

ALPHA-AMINOPYRIDINE ANTIHISTAMINIC COMPOUNDS

Raymond Jacques Horclois, Malakoff, France, assignor to Societe des Usines Chimiques Rhone-Poulenc, Paris, France, a French body corporate No Drawing. Application June 26, 1946, Serial No. 679,580. In France January 19, 1944

Section 1, Public Law 690, August 8, 1946
Patent expires January 19, 1964

3 Claims. (Cl. 260—296)

This invention relates to new chemical compounds and to processes of producing the same; more specifically it concerns new substituted diamines possessing therapeutic utility.

The new substituted diamines of the present invention are α-aminopyridines substituted on the amino nitrogen by a dimethylaminoalkyl containing at least four carbon atoms and by a member of the class consisting of alkyloxyethyl and aralkyloxyethyl groups. These new compounds conform to the general formula

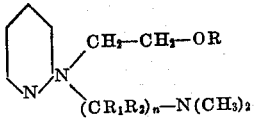

in which R represents a member of the class consisting of alkyl or aralkyl groups, $R_1$ and $R_2$ are members of the class consisting of hydrogen atoms or alkyl groups and $n$ is an integer not less than 2.

These new compounds are of value in the pharmaceutical field, particularly on account of their anti-histaminic activity. They may be prepared by condensing an α-(N-alkoxy- or N-aralkoxy-ethyl)-aminopyridine with a ω-halogenated tertiary amine of the formula:

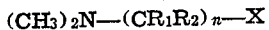

(in which X represents a halogen atom); or by condensing an N' - dimethyl - aminoalkylaminopyridine with an alkyl or aralkyl ether-oxide of a chlorhydrin of ethylene glycol.

The present invention is illustrated by the following example:

Example 16.5 g. of α-(N'-dimethylaminoethyl)aminopyridine in 25 ccs. of toluene are allowed to react with 5 g. of sodamide (85%); over a period of 15 minutes 11 g. of ethoxyethyl chloride are then added at 115° C. and the reaction mixture is heated at 110° C. for 2 hours. The reaction mixture is then treated with 50 ccs. of a solution of potash (36° Bé.) and finally extracted with ether. On distillation of the ether extract, α(N-dimethyl - aminoethyl - N - ethoxyethyl-)aminopyridine distills over at 160–165° C./1.7 mm.

It should be understood that the invention is not limited to the disclosure of the foregoing example. Thus, by analogous procedure there may also be obtained compounds of the foregoing general formula, in which, instead of ethoxy, R represents other alkoxy groups for example, butoxy or propoxy; in which, instead of hydrogen atoms, either $R_1$ or $R_2$ represents alkyl groups—for example the group $(CR_1R_2)_n$ may represent the isobutyl radical; in which $n$ may be greater than 2, for example, an integer greater or less than 10 such as 3, 4 or 5.

I claim:

1. A member of the class of alpha-aminopyridines substituted on the amino nitrogen by a dimethylaminoalkyl group containing at least four carbon atoms and by an alkoxyethyl group.

2. Alpha -(N- dimethyaminoethyl -N- ethoxyethyl)-aminopyridine.

3. An alpha-aminopyridine substituted on the amino nitrogen by a dimethylaminoethyl group and by an alkoxyethyl group.

RAYMOND JACQUES HORCLOIS.

No references cited.